(12) United States Patent
Hirata

(10) Patent No.: US 6,811,850 B1
(45) Date of Patent: Nov. 2, 2004

(54) OPTICAL INFORMATION MEDIUM AND ITS FABRICATION PROCESS

(75) Inventor: Hideki Hirata, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/531,449

(22) Filed: Mar. 20, 2000

(30) Foreign Application Priority Data

| Mar. 19, 1999 | (JP) | ............................................ 11-076951 |
| May 27, 1999 | (JP) | ............................................ 11-148602 |
| Nov. 16, 1999 | (JP) | ............................................ 11-326101 |

(51) Int. Cl.$^7$ ............................... B32B 3/02; B32B 7/12
(52) U.S. Cl. .................... 428/64.2; 428/64.1; 428/64.7; 428/64.9; 428/343
(58) Field of Search ................ 428/343, 64.1, 428/64.7, 64.9

(56) References Cited

U.S. PATENT DOCUMENTS

| 4,719,171 A | * | 1/1988 | Ikenaga et al. ............. 430/271 |
| 5,254,382 A | * | 10/1993 | Ueno et al. .................... 428/64 |
| 5,328,816 A | * | 7/1994 | Tamura et al. .............. 430/495 |
| 5,776,643 A | * | 7/1998 | Hirai .............................. 430/7 |
| 6,219,308 B1 | * | 4/2001 | Watanabe et al. ............. 369/13 |
| 6,511,729 B1 | * | 1/2003 | Hirata ........................ 428/64.1 |

FOREIGN PATENT DOCUMENTS

| JP | 3-75944 | 12/1991 |
| JP | 9-161333 | 6/1997 |
| JP | 10-269624 | 10/1998 |
| JP | 10-283683 | 10/1998 |

\* cited by examiner

*Primary Examiner*—Cynthia H Kelly
*Assistant Examiner*—L. Ferguson
(74) *Attorney, Agent, or Firm*—Oblon, Spivak, McClelland, Maier & Neustadt, P.C.

(57) ABSTRACT

An optical information medium comprises a supporting substrate 20, an information recording surface 4 on the supporting substrate 20 and a light-transmitting layer 2 on the information recording surface 4. Recording light and/or reproducing light are incident on the information recording surface 4 through the light-transmitting layer 2. The light-transmitting layer 2 comprises a light-transmitting sheet 201 formed of a resin such as polycarbonate, cyclic polyolefin and polyarylate and an adhesive layer 202 for bonding the light-transmitting sheet 201 to an associated side of the supporting substrate.

19 Claims, 1 Drawing Sheet

RECORDING AND REPRODUCING LIGHT

OPTICAL INFORMATION MEDIUM AND ITS FABRICATION PROCESS

BACKGROUND OF THE INVENTION

1. Field of the Invention

The present invention relates to an optical information medium such as read only optical disks and optical recording disks and its fabrication process.

2. Description of the Background

In recent years, optical information media such as read only optical disks and optical recording disks have been required to have ever-higher recording densities and, hence, ever-higher capacities so as to record or store an enormous amount of information such as moving image information. To meet this requirement, media having such high recording densities are now under extensive and intensive research and development.

According to one of approaches proposed so far to this end, recording and reproducing wavelengths are shortened while the numerical aperture (NA) of an objective in a recording and reproducing optical system is increased, thereby reducing the diameter of recording and reproducing laser beams, as typically practiced in the case of a digital versatile disk or DVD. When the recording and reproducing wavelength is decreased from 780 nm down to 650 nm and the NA is increased from 0.45 up to 0.6, the recording capacity of the DVD is 4.7 GB/surface or 6 to 8 times as large as that of a CD.

As the NA increases, however, the tilt margin decreases. The tilt margin is the tolerance of the tilt of an optical recording medium with respect to an optical system, and is determined by the NA. Here let $\lambda$ be a recording and reproducing wavelength and t be the thickness of a transparent substrate on which recording and reproducing light is incident. Then, the tilt margin is proportional to:

$$\lambda/(t \cdot NA^3)$$

As the optical recording medium tilts with respect to a laser beam, wavefront aberration (coma) occurs. Here let n denote the refractive index of the substrate and $\theta$ stand for the angle of tilt. Then, the wavefront aberration coefficient is given by:

$$(\tfrac{1}{2}) \cdot t \cdot \{n^2 \cdot \sin\theta \cdot \cos\theta\} \cdot NA^3/(n^2 - \sin^2\theta)^{-5/2}$$

From these expressions, it is understood that the thickness t of the substrate should preferably be reduced to increase the tilt margin and prevent the occurrence of coma. In a DVD, indeed, the tilt margin is ensured by making the thickness of the substrate about half (ca. 0.6 mm) the thickness (ca. 1.2 mm) of the substrate of a CD. On the other hand, the thickness variation margin for the substrate is given by:

$$\lambda/NA^4$$

When there a thickness variation in the substrate, another wavefront aberration (spherical aberration) occurs. Here let $\Delta t$ be the thickness variation of the substrate. Then, the spherical aberration coefficient is given by:

$$\{(n^2-1)/8n^3\} \cdot NA^4 \cdot \Delta t$$

From these expressions, it is understood that to reduce the spherical aberration produced with an increasing NA, it is required to reduce the thickness variation as much as possible. For instance, $\Delta t$ is of the order of $\pm 100\ \mu m$ in the case of a CD whereas $\Delta t$ is limited to $\pm 30\ \mu m$ in the case of a DVD.

To record moving images of higher quality over an extended period of time, a structure enabling a substrate to become thinner has been put forward in the art. According to this structure, a substrate having an ordinary thickness is used as a supporting substrate for maintaining rigidity. Pits or a recording layer are formed on the surface of the substrate. A light-transmitting layer of about 0.1 mm in thickness is provided as a thin substrate on the recording layer, so that recording and reproducing light can be incident on the recording layer through the light-transmitting layer. With this structure, it is possible to achieve an ever-higher NA and, hence, an ever-higher recording density, because the substrate can be made much thinner than could be possible with conventional structures.

However, it is very difficult to form the light-transmitting layer used for this structure, using resin injection molding. To eliminate such difficulty, it has been proposed to form such a light-transmitting layer by spin-coating of an ultraviolet-curing resin, as typically disclosed in JP-A 9-161333. In JP-A 10-269624, it is proposed to coat a dispersion of spacer particles in a photo-curing resin on a substrate and press the dispersion down on the substrate with a plate material, thereby forming a light-transmitting layer of uniform thickness. In JP-A 10-283683, it is proposed to bond an ultraviolet-curing resin onto a light-transmitting sheet.

When a light-transmitting layer is formed by the processes set forth in the aforesaid publications, however, a medium warping problem arises due to shrinkage upon curing of the resin forming part of the light-transmitting layer. When the photo-curing resin is formed into a film of about 0.1 mm in thickness, it is difficult to achieve uniform curing in the thickness direction. As a result, the light-transmitting layer lacks optical uniformity, and the reliability of the medium is likely to become low due to the presence of uncured monomers. According to the process shown in the aforesaid JP-A 10-283683, the ultraviolet-curing resin layer is thinner than those obtained by other processes because the ultraviolet-curing resin is used as an adhesive layer, and so the medium is less susceptible to warpage. However, the distortion by shrinkage of the resin upon ultraviolet curing leads to another problem that the index of double refraction of the light-transmitting sheet becomes large.

SUMMARY OF THE INVENTION

An object of the present invention is to provide an optical information medium comprising a supporting substrate, an information-recording surface provided on a surface of said supporting substrate and a light-transmitting layer provided on said information-recording surface and formed of a resin, wherein said light-transmitting layer is allowed to have a uniform thickness so that optical heterogeneity of the light-transmitting layer, especially an increase in the birefringence of the light-transmitting layer can be reduced, and any warping of the optical information medium is prevented.

Such an object is achievable by the inventions recited below as (1) to (6).

(1) An optical information medium comprising a supporting substrate, an information-recording surface provided on the supporting substrate and a light-transmitting layer provided on the information-recording surface, with recording light and/or reproducing light incident on the information-recording surface through the light-transmitting layer, wherein:

said light-transmitting layer comprises a light-transmitting sheet formed of a resin and an adhesive layer containing pressure-sensitive adhesive for bonding said light-transmitting sheet to an associated side of said supporting substrate.

(2) The optical information medium according to (1), wherein said adhesive layer contains a transparent acrylic resin.

(3) The optical information medium according to (1), wherein said light-transmitting sheet is formed of one resin selected from polycarbonate, polyarylate and cyclic polyolefin.

(4) The optical information medium according to (1), wherein said light-transmitting sheet has been prepared by a casting technique.

(5) The optical information medium according to (1), wherein said light-transmitting sheet has a thickness of 30 to 300 μm.

(6) A process of fabricating an optical information medium as recited in (1), which comprises a step of bonding a light-transmitting sheet larger than said supporting substrate to an associated side of said supporting substrate, and then cutting off a region of said light-transmitting sheet that is unbonded to said supporting substrate by laser processing.

DETAILED DESCRIPTION OF THE PREFERRED EMBODIMENTS

Figure 1:
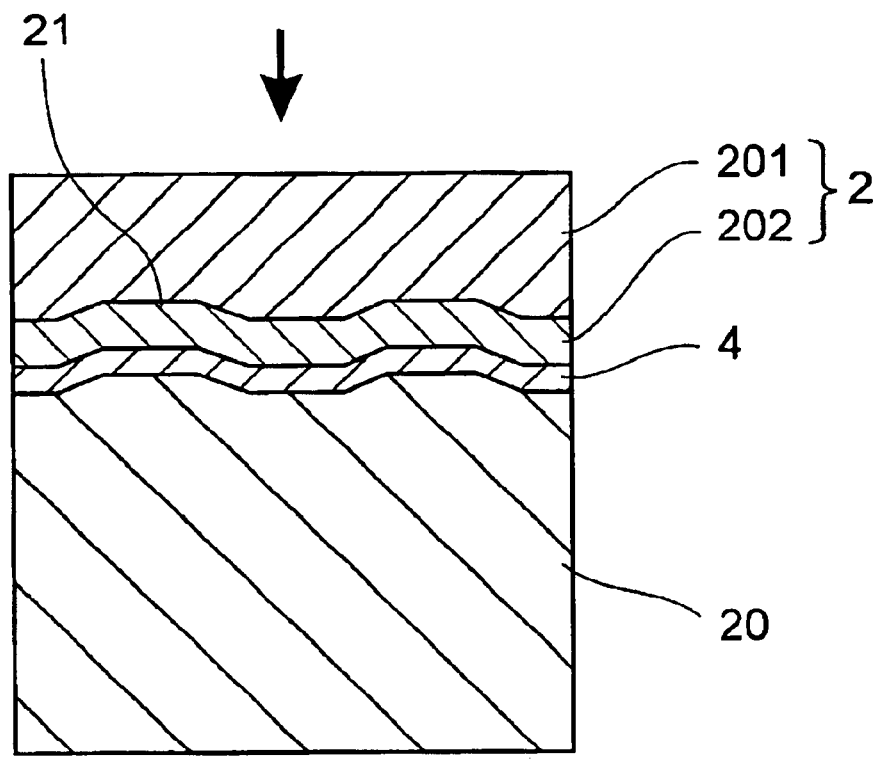
FIG. 1 is a partial sectional view of one embodiment of the optical information medium according to the invention.

One exemplary arrangement of the optical information medium according to the invention is shown in FIG. 1. This optical information medium is an information recording medium comprising a supporting substrate 20 and an information recording surface or a recording layer 4 provided on the supporting substrate 20. This recording layer 4 includes thereon a light-transmitting layer 2. Recording light and/or reproducing light are incident on the recording layer 4 through the light-transmitting layer 2. The present invention may be applied to every optical recording medium irrespective of the type of the recording layer: for instance, a phase change type recording medium, a pit type recording medium, and a magneto-optical recording medium. Usually, a dielectric layer and a reflective layer are provided on at least one side of the recording layer for the purposes of protecting the recording layer, ensuring optical effects, and so on, although not shown in FIG. 1. The present invention may also be applied to the read only type to say nothing of the recordable type shown in FIG. 1. In this case, rows of pits formed integrally with the supporting substrate 20 define the information-recording surface.

In the optical information medium shown in FIG. 1, the light-transmitting layer 2 is built up of a light-transmitting sheet 201 and an adhesive layer 202 for bonding the light-transmitting sheet 201 to the associated side of the supporting substrate 20. The adhesive layer 202 is made up of a pressure-sensitive adhesive that is transparent to recording and reproducing light and has an adhesion strong-enough to bond the light-transmitting sheet to a layer present on the surface of the supporting substrate.

The use of the adhesive agent for the bonding of the light-transmitting sheet to the associated side of the supporting substrate has the following advantages:

(1) Curing is unnecessary unlike an ultraviolet-curing adhesive agent; the medium is less susceptible to warpage due to no distortion by shrinkage of resin upon curing.

(2) Curing is unnecessary with no distortion by shrinkage of resin upon curing, resulting in little or no increase in the index of birefringence of the light-transmitting sheet.

(3) Any curing step is not needed, and so the equipment used can be simplified.

(4) The adhesive layer can be previously formed as a coating film on the light-transmitting sheet, and so can have a reduced thickness profile. Thus, the problems arising so far from the combination of the light-transmitting sheet with the ultraviolet-curing adhesive agent can be eliminated by the present invention.

For the constituent of the adhesive layer, pressure-sensitive adhesives, for instance, any of acrylic resins, silicone resins and rubber materials may be used. In the practice of the invention, however, it is preferable to use an acrylic resin because of being excellent in optical properties, ensuring a wide design margin concerning adhesion and heat resistance, and being inexpensive as well.

No particular limitation is imposed on how to form the adhesive layer in the practice of the invention. However, it is preferable to make use of a process that enables the adhesive agent to be coated on the light-transmitting sheet with a uniform thickness. It is also preferable to make use of an adhesive sheet obtained by coating an adhesive agent on both sides of a transparent base film. Then, this adhesive sheet is used as the adhesive layer in the present invention, so that the light-transmitting sheet can be bonded to the associated side of the supporting substrate. No particular limitation is again imposed on how to coating the adhesive agent; a suitable selection may be made from die coating, roll coating, gravure coating, dip coating and the like. However, it is preferable to make use of die coating because reduced film thickness profiles are achievable.

No particular limitation is placed on how the light-transmitting sheet is actually laminated on the associated side of the supporting substrate using the adhesive layer. For instance, when the present invention is applied to an optical disk, a disk form of light-transmitting sheet previously configured to conform substantially to the shape and size of the supporting substrate may be laminated on the associated side of the supporting substrate. Alternatively, a light-transmitting sheet blank may first be laminated on the associated side of the supporting substrate, and then configured to a disk by removing a portion of the blank that is not bonded to the associated side of the supporting substrate. In view of mass productivity and fabrication cost reductions, however, the latter is preferred. For instance, it is preferable to make use of a method wherein a long length of light-transmitting sheet blank is continuously laminated on a multiplicity of disks using a laminator or the like, and unnecessary regions of the blank are then trimmed off. Preferably but not exclusively, press punching and cutting are used as the trimming means. However, it is preferable to make use of laser processing because burrs and cuttings do not occur at the laser-trimmed ends of the light-transmitting sheet. For laser processing, an ordinary laser trimmer is used.

The thickness of the adhesive layer may be appropriately determined in such a way that uniform thickness is obtainable and sufficient adhesive power is achievable. However, the adhesive layer should have a thickness of preferably 5 to 70 μm, and more preferably 10 to 50 μm. At too small a thickness, the adhesion of the adhesive layer becomes worse, with lamination yield drops. With too thick an adhesive layer, on the other hand, the film thickness profile becomes large; that is, it is required to make the light-transmitting sheet thinner.

The light-transmitting sheet should preferably be formed of at least one resin selected from polycarbonate, polyarylate and cyclic polyolefin.

No particular limitation is imposed on the polycarbonate used herein; for instance, a generally available bisphenol type of aromatic polycarbonate may be used. For the polycarbonate sheet prepared by the casting technique to be described later, for instance, Pure Ace (Teijin Limited) is commercially available.

The polyarylate is a polyester of a divalent phenol and an aromatic dicarboxylic acid. The polyarylate used herein is a noncrystalline polyarylate; however, it is particularly preferable to use a condensation polymer of bisphenol A and terephthalic acid. The polyarylate is susceptible to double refraction because of having an aromatic ring as is the case with polycarbonate; however, this is higher in heat resistance than polycarbonate. For the polyarylate sheet prepared by the casting technique to be referred to later, for instance, Elmeck (Kanegafuchi Chemical Industry Co., Ltd.) is commercially available.

The cyclic polyolefin used herein should preferably be excellent in light transmission. The cyclic polyolefin excellent in light transmission, for instance, includes a noncrystalline, cyclic polyolefin starting from a norbornene compound. This is also excellent in heat resistance. In the practice of the invention, use may be made of commercially available cyclic polyolefins such as Arton (JSR Co., Ltd.), Zeonex (Nippon Zeon Co., Ltd.) and Apel (Mitsui Chemical Industry Co., Ltd.). Of these, Arton and Zeonex are commercially available in film forms. Arton and Zeonex are the products obtained by the ring-opening polymerization and hydrogenation of the norbornene monomer. Arton is easily soluble in a solvent because an ester group is introduced in the side chain of the norbornene monomer. This polymer is preferred for the reasons that the solvent casting technique to be referred to later can be used for sheet-making, its adhesion strength to the adhesive layer can be enhanced due to its good adhesion to an organic material, and it is unlikely to attract dust due to its low chargeability.

No particular limitation is imposed on how to make the light-transmitting sheet. However, it is difficult to make such a light-transmitting sheet as used herein by means of conventional injection molding because of its thinness. It is thus preferable to make use of techniques enabling resin to be configured in a film form such as the solvent casting technique and a melt extrusion technique. Of these, preference is given to the casting technique such as one described typically in JP-B 3-75944. The publication discloses a casting process by which a flexible disk excellent in transparency, birefringence, flexibility, surface accuracy and thickness uniformity can be produced. In the practice of the invention, it is preferable to make use of this casting process to prepare the light-transmitting sheet. According to this casting process, the light-transmitting sheet can be prepared through the following steps.

(1) A resin pellet such as a polycarbonate pellet is dissolved in a solvent such as methylene chloride, acrylonitrile and methyl acrylate.

(2) After fully stirred, defoamed and filtered, the solution is continuously cast on a mold having high surface accuracy through a die.

(3) The cast product is passed through a drying furnace to evaporate off the solvent, and then continuously rolled up.

The light-transmitting sheet prepared by such a solvent casting process is smaller in birefringence than that prepared by a general melt extrusion process because the tension applied on the sheet is small. A sheet prepared by the melt extrusion process, in contrast, gives rise to a birefringence profile in the stretching direction. With this solvent casting process, a sheet having an excellent surface state and a uniform thickness can be prepared by proper control of the rate of evaporation of the solvent, and such die line flaws as found in a sheet prepared by the melt extrusion process do not occur.

It is here noted that whether the light-transmitting sheet has been prepared by the solvent casting process or not can be checked depending on whether or not an isotropic birefringence pattern is found. This may also be checked by gas chromatography or other qualitative analysis of the solvent remaining in the sheet.

The thickness of the light-transmitting layer should preferably be selected from the range of 30 to 300 $\mu$m. Too thin a light-transmitting layer is susceptible to some considerable optical influence due to dust attracted on its surface. On the other hand, a light-transmitting layer having a thickness exceeding the aforesaid upper limit may be formed by injection molding or other molding processes.

The supporting substrate 20 is provided to maintain the rigidity of the medium. The substrate 20 has usually a thickness of 0.2 to 1.2 mm, and preferably 0.4 to 1.2 mm, and may be either transparent or opaque. An guide groove usually provided in an optical recording medium may be formed by transfer of a groove provided in the supporting substrate 20 during the formation of the light-transmitting layer, as shown in FIG. 1. A guide groove 21 shown in FIG. 1 is concave toward the side of the medium on which light is incident.

EXAMPLES

Example 1

Read only optical disk samples shown in Table 1 were prepared through the following process steps.

Sample No. 1

By sputtering, a reflective film made of an Al alloy was formed on the surface of a disk form of supporting substrate (a polycarbonate substrate of 120 mm in diameter and 1.2 mm in thickness) having asperities defining pits for carrying information thereon, as seen from the light-transmitting layer side.

Then, a polycarbonate sheet (having a thickness of 70 $\mu$m and an index of double refraction of 20 nm) was bonded as a light-transmitting sheet to the surface of the reflecting film with an adhesive layer of 30 $\mu$m in thickness interleaved between them. The polycarbonate sheet used herein had been previously configured to conform to the shape and size of the supporting substrate. For the adhesive layer, a double-sided adhesive sheet was used, which was prepared by coating an acrylic resin adhesive agent on both sides of a transparent base. This polycarbonate was Pure Ace (Teijin Limited) prepared by the aforesaid casting process, and having a glass transition point of 145° C. and a molecular weight of about 40,000.

Sample No. 2

This sample was prepared according to sample No. 1 with the exception that a polycarbonate sheet (having a thickness of 70 $\mu$m and an index of double refraction of 90 nm) made by melt extrusion was used as the light-transmitting sheet. The polycarbonate itself was the same as that used for sample No.

Sample No. 3 (for comparison)

An acrylic type of ultraviolet-curing adhesive (DVD-003 made by Nippon Kayaku Co., Ltd.) was spin-coated on the surface of a reflective film to form an adhesive layer of 30 $\mu$m in thickness thereon. Then, the polycarbonate sheet used for sample No. 1 was bonded onto the adhesive layer to obtain a light-transmitting layer.

Sample No 4 (for Comparison)

This sample was prepared following sample No. 3 with the exception that the same polycarbonate sheet as in sample No. 2 was used as the light-transmitting sheet.

Sample No. 5 (for comparison)

An ultraviolet-curing resin (SD-301 made by Dainippon Ink & Chemicals, Inc.) was spin-coated on the surface of a reflective film, and irradiated with ultraviolet rays for curing, thereby obtaining a light-transmitting layer of 100 μm in thickness.

Sample No. 6

This sample was prepared following sample No. 1 with the exception that a cyclic polyolefin sheet (having a thickness of 70 μm and an index of birefringence of 10 nm) made by the casting process was used as the light-transmitting sheet. The cyclic polyolefin sheet used herein was an Arton sheet (made by JSR Co., Ltd. and having a glass transition point of 170° C.).

Sample No. 7 (for Comparison)

This sample was prepared following sample No. 3 with the exception that the same cyclic polyolefin sheet as in sample No. 6 was used as the light-transmitting sheet.

Sample No. 8

This sample was prepared following sample No. 1 with the exception that a polyarylate sheet (having a thickness of 70 μm and an index of birefringence of 25 nm) made by the casting process was used. The polyarylate sheet used herein was an Elmech sheet (made by Kanegafuchi Chemical Industry Co., Ltd., and having a glass transition point of 200° C.).

Sample No. 9 (for Comparison)

This sample was prepared following sample No. 3 with the exception that the same polyarylate sheet as in sample No. 8 was used as the light-transmitting sheet.

Estimation

For each sample, the thickness profile of the light-transmitting layer (the maximum value—the minimum value) and the amount of warpage were measured. The results are given in Table 1. The thickness profile was measured within a region located at a 25–58 mm radius position of the sample, using a laser focus displacement meter made by Keyence. The amount of warpage was measured using a mechanical accuracy measuring device made by Ono Sokki Co, Ltd., while light was allowed to strike on the light-transmitting layer from the supporting substrate side. The measuring linear rate was 4 m/s.

The index of double refraction of the light-transmitting layer was measured using a rotary analyzer type birefringence meter made by Admon Science. The results are given in Table 1. The index of double refraction was measured for the ultraviolet-cured resin layer in sample No. 5 and for the adhesive layer or the laminated assembly of the adhesive layer and light-transmitting sheet in other samples.

TABLE 1

| Sample No. | Bonding Means | Material for Light-Transmitting Sheet | Light-Transmitting Sheet Making Process | Thickness Profile (μm) | Amount of warpage (deg) | Double Refraction (nm) |
|---|---|---|---|---|---|---|
| 1 | Pressure-Sensitive Adhesive | polycarbonate | Casting | 2 | 0.20 | 20 |
| 2 | Pressure-Sensitive Adhesive | polycarbonate | Melt Extrusion | 4 | 0.22 | 130 |
| 3 (comp.) | UV-Curing Adhesive | polycarbonate | Casting | 14 | 0.72 | 40 |
| 4 (comp.) | UV-Curing Adhesive | polycarbonate | Melt Extrusion | 18 | 0.75 | 200 |
| 5 (comp.) | UV-Curing Adhesive | — | — | 25 | Un-measurable | 10 |
| 6 | Pressure-Sensitive Adhesive | Cyclic Polyolefin | Casting | 3 | 0.24 | 15 |
| 7 (comp.) | UV-Curing Adhesive | Cyclic Polyolefin | Casting | 17 | 0.65 | 25 |
| 8 | Pressure-Sensitive Adhesive | Polyarylate | Casting | 3 | 0.26 | 30 |
| 9 (comp.) | UV-Curing Adhesive | Polyarylate | Casting | 20 | 0.68 | 40 |

From Table 1, the advantages of the invention are evident. From comparisons of No. 1 with No. 3, No. 2 with No. 4, No. 6 with No. 7 and No. 8 with No. 9, it is found that the uniformity, amount of warpage and index of double refraction of the light-transmitting layer are strikingly improved by bonding the light-transmitting sheet to the side of the supporting substrate using the adhesive layer. From a comparison of No. 1 with No. 2, it is then found that the increase in the birefringence of the polycarbonate sheet can be almost perfectly reduced by combining the polycarbonate sheet with the adhesive agent. Regarding the cyclic polyolefin sheet and polyarylate sheet, too, the index of double refraction can be strikingly reduced by preparing them by the casting process, as is the case with the polycarbonate sheet.

The sample referred to as "unmeasurable" in Table 1 could not be measured due to too large warpage.

Example 2

Sample No. 10

By sputtering, a reflective film made of an Al alloy was formed on the surface of a disk form of supporting substrate (a polycarbonate substrate of 120 mm in diameter and 1.2 mm in thickness) having asperities defining pits for carrying information thereon, as seen from the light-transmitting layer side.

Then, a transparent acrylic adhesive agent of 30 μm in thickness was coated by roll coating on one surface of a light-transmitting sheet of 300 mm in width and 100 m in length. This light-transmitting sheet was a polycarbonate sheet (made by Nitto Denko Co., Ltd.) made by the casting process and having a thickness of 70 μm.

Then, the light-transmitting sheet was laminated on the surface of the reflecting film, using a laminator (made by MKC). Subsequently, a region of the light-transmitting sheet unbonded to the surface of the reflective film was trimmed off by a laser trimmer, thereby configuring the light-transmitting sheet in conformity to the shape (disk shape having a center hole) of the supporting substrate. The time taken for trimming was 10 seconds.

Sample No. 11

This sample was prepared following sample No. 10 with the exception that the light-transmitting sheet was configured by press punching. The time taken for press punching was 20 seconds.

Sample No. 12

This sample was prepared following sample No. 10 with the exception that the light-transmitting sheet was configured by lathe processing. The time taken for lathe processing was 2 minutes.

Estimation

For each sample, the inner and outer peripheral ends of the light-transmitting sheet were visually observed. As a result, sample No. 11 was found to have burrs due to press punching whereas sample No. 12 was found to have the light-transmitting sheet turned up. In sample No. 10, in contrast, neither burrs nor such a turning-up were found. The thickness profile (the maximum value–the minimum value) of each sample at its outer peripheral portion (at a 58 mm radius position) in its peripheral direction was measured, using a laser focus displacement meter made by Keyence). As a consequence, sample No. 10 was found to have a small value of 3 μm in contrast of 8 μm for sample No. 11 and 13 μm for sample No. 12.

From these results, the effect obtained by use of laser processing is evident.

EFFECT OF THE INVENTION

In the present invention, the light-transmitting sheet made of resin is bonded to the supporting substrate using the adhesive layer, so that the light-transmitting layer can have a uniform thickness while the increase in the birefringence of the light-transmitting sheet can be reduced, and the warping of the optical recording medium can be reduced.

Japanese Patent Application No. 76951/1999, 148602/1999 and 326101/1999 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

I claim:

1. An optical information medium, comprising a supporting substrate, an information-recording surface provided on the supporting substrate and a light-transmitting layer provided on the information-recording surface, wherein:

the light-transmitting layer comprises a light-transmitting sheet formed of a resin and an adhesive layer containing pressure-sensitive adhesive for bonding the light-transmitting layer to an associated side of the information-recording surface; and the light-transmitting sheet is formed of one resin selected from the group consisting of polycabonate, polyarylate and cyclic polyolefin.

2. The optical information medium of claim 1, wherein said adhesive layer comprises a transparent acrylic resin.

3. The optical information medium of claim 1, wherein the light-transmitting sheet is prepared by casting.

4. The optical information medium of claim 1, wherein the light-transmitting layer has a thickness of 30 to 300 μm.

5. The optical information medium of claim 1, wherein the adhesive layer has a thickness of 5 to 70 μm.

6. The optical information medium of claim 5, wherein the adhesive layer has a thickness of 10 to 50 μm.

7. The optical information medium of claim 1, wherein the light-transmitting sheet is formed of polyarylate, which is non-crystalline.

8. The optical information medium of claim 1, wherein said polyarylate is a condensation polymer of bisphenol A and terephthalic acid.

9. The optical information medium of claim 1, wherein the light-transmitting sheet is formed of cyclic polyolefin.

10. The optical information medium of claim 9, wherein said cyclic polyolefin is based on a norbornene compound.

11. The optical information medium of claim 10, wherein said cyclic polyolefin is produced by ring-opening polymerization and hydrogenation of norbornene monomer.

12. The crystal information medium of claim 1, wherein the light-transmitting sheet is formed of polycarbonate.

13. The optical information medium of claim 1, wherein the supporting substrate has a thickness of from 0.2 to 1.2 mm.

14. A process of fabricating the optical information medium of claim 1, which comprises the steps of:

a) binding a light-transmitting sheet larger than said supporting substrate to an associated side of said supporting substrate with an adhesive layer containing a pressure-sensitive adhesive; and b) cutting off a region of said light-transmitting sheet that is unbonded to said supporting substrate by laser processing;

wherein the light transmitting sheet is formed of one resin selected from the group consisting of polycarbonate, polyarylate, and cyclic polyolefin.

15. A method of recording information, which comprises contacting an information recording surface of the optical information medium of claim 1, with recording light or reproducing light or both.

16. The optical information medium of claim 1, wherein the pressure-sensitive adhesive in an acrylic resin, silicone resin or a rubber material.

17. The optical information medium of claim 1, wherein the pressure-sensitive adhesive is an arylic resin.

18. The optical information medium of claim 1, wherein the pressure-sensitive adhesive comprises a double-sided adhesive sheet.

19. The optical information medium of claim 18, wherein said double-sided adhesive sheet is coated with an acrylic resin adhesive agent.

* * * * *